T. RAMAGE.
AUTOMOBILE APPLIANCE.
APPLICATION FILED MAY 7, 1921.
1,424,942. Patented Aug. 8, 1922.
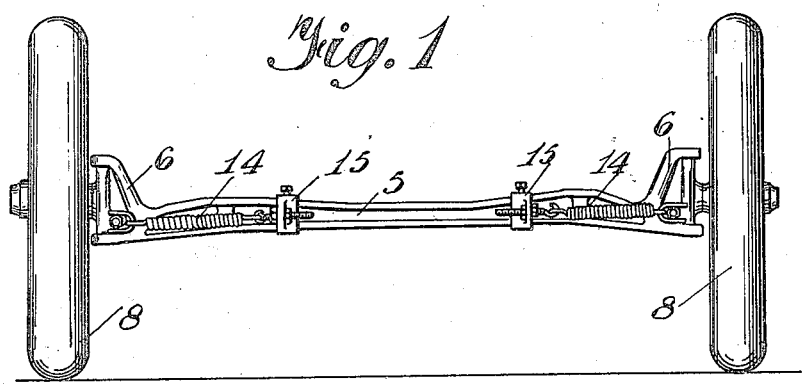
Fig. 1
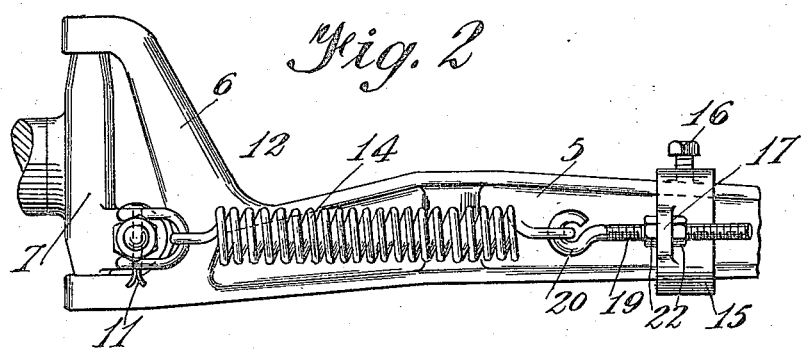
Fig. 2
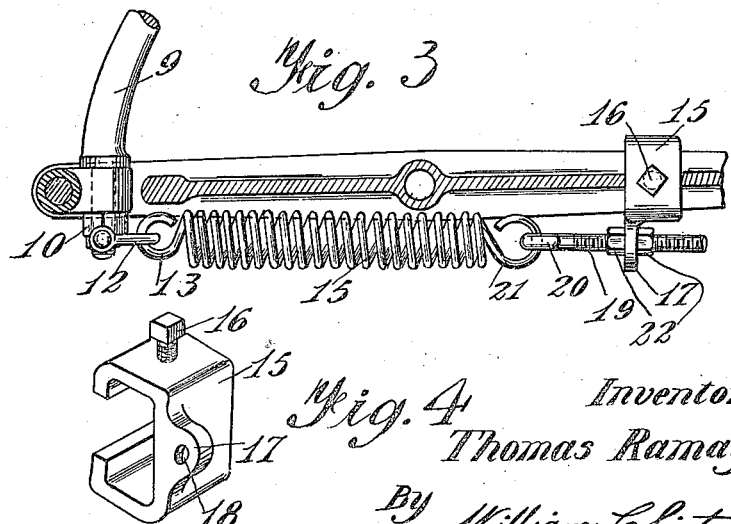
Fig. 3
Fig. 4
Inventor
Thomas Ramage
By William Clinton
Attorney

UNITED STATES PATENT OFFICE.

THOMAS RAMAGE, OF THE PAS, MANITOBA, CANADA.

AUTOMOBILE APPLIANCE.

1,424,942.	Specification of Letters Patent.	Patented Aug. 8, 1922.

Application filed May 7, 1921. Serial No. 467,555.

*To all whom it may concern:*

Be it known that I, THOMAS RAMAGE, a subject of the King of Great Britain, residing at The Pas, Province of Manitoba, Canada, have invented certain new and useful Improvements in Automobile Appliances; and I do hereby declare that the following is a full, clear, and exact description of the invention, such as will enable others skilled in the art to which it appertains to make and use the same.

The present invention relates to new and useful improvements in automobile appliances, and more particularly to a tensioning device for the steering mechanism.

The primary object of the invention is the provision of a tensioning device for the steering mechanism of an automobile or the like, by means of which the said steering mechanism is held tightly against any undesired loose or shaking movement.

Another object of the invention is the provision of a tensioning device for the steering mechanism of automobiles or the like, which comprises a resilient element, connected to the front wheel spindles and axle, holding the latter against any undesired movement.

Still another object of the invention is the provision of a tensioning device for automobile steering mechanism or the like, which comprises a spring adapted to be secured to the front wheel spindle of an automobile, and also to the axle for holding said spindles tightly against any undesired loose play, and yet permitting the necessary movement incident for the proper steering of the machine.

A still further object of the invention is the provision of a tensioning device for the steering mechanism of automobiles or the like, which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed and illustrated in the accompanying drawing, forming a part of the present application, and in which:

Figure 1 is a front elevation of an axle, showing the steering wheel, and its spindle, and my invention applied thereto;

Figure 2 is an enlarged detailed view of one end of the axle, showing the invention applied thereto;

Figure 3 is a horizontal sectional view taken through the axle and showing the invention in plan view; and, Figure 4 is a detail perspective view of one of the axles and engaging clips.

Referring now to the accompanying drawing by corresponding characters of reference throughout the several views, the numeral 5 designates in general the axle of an automobile, which may be of any desired shape, size or construction, the opposite ends being forked as at 6, and having pivoted therebetween the spindle 7, on which are mounted the steering wheels 8.

The usual spindle arms are shown at 9 and are connected to the spindles in the usual manner, passing therethrough and held against displacement by nuts 10 which are threaded on the forward ends of the arms 9, holding the latter firmly in position.

The nuts 10 are held against displacement by the usual cotter pins 11, clearly shown in Figures 2 and 3 of the drawing.

A clevis 12 is secured to each spindle by means of the cotter pins 11 above referred to, and has secured thereto, the eye 13 of a tensioning device 14, which may be of any desired size, sufficient to give the necessary tension to the steering mechanism above referred to.

An attaching clip 15 is slidably mounted upon each end of the axle 5, and may be held in position against any sliding movement by a set screw 16.

A forwardly extending ear 17 projects from each clip 15 and is provided with an aperture 18, through which a threaded rod 19 passes. The outer end of each rod is provided with an eye 20 which is adapted to receive an eye 21 formed upon the inner end of each spring device 14, while nuts 22 are threaded upon the rods 19 upon opposite sides of the ears 17 for the purpose of holding the said rods in adjusted positions relative to the clips 18. By this means the position of the rods may be adjusted relative to the clips 15 and the tensions of the springs 14 regulated.

From the foregoing description taken in connection with the accompanying drawings, it will be readily seen that the above device is of such nature that tension will be applied to the spindles 7 which will hold them against any undesired movement and also tension the entire steering mechanism, preventing any undesired loose play which might cause accidents or trouble in steering.

From the foregoing description, it will also be readily seen that a tensioning device for the steering mechanism of automobiles is provided, which will fulfil all of the necessary requirements of such a device, and it should be understood in this connection, that various minor changes in the specific details of construction may be resorted to within the scope of the appended claim without departing from the spirit or sacrificing any of the advantages of the invention.

Having thus fully described the invention, what I claim as new and desire to secure by Letters Patent is:—

The combination with the front axle of an automobile, a steering spindle supported thereby, a steering arm extending through said spindle having a forwardly projecting end, a nut on said projecting end and a cotter pin extending through said projecting end for locking said nut, of a tensioning device connecting said steering spindle with said axle, said tensioning device comprising a clevis connected to said cotter pin, a detachable clip connected to said axle, a forwardly projecting ear formed with said clip, a spring, one end of said spring being connected to said clevis, and an adjustable connection between said ear and the opposite end of said spring.

In witness whereof I have hereunto set my hand.

THOMAS RAMAGE.